UNITED STATES PATENT OFFICE.

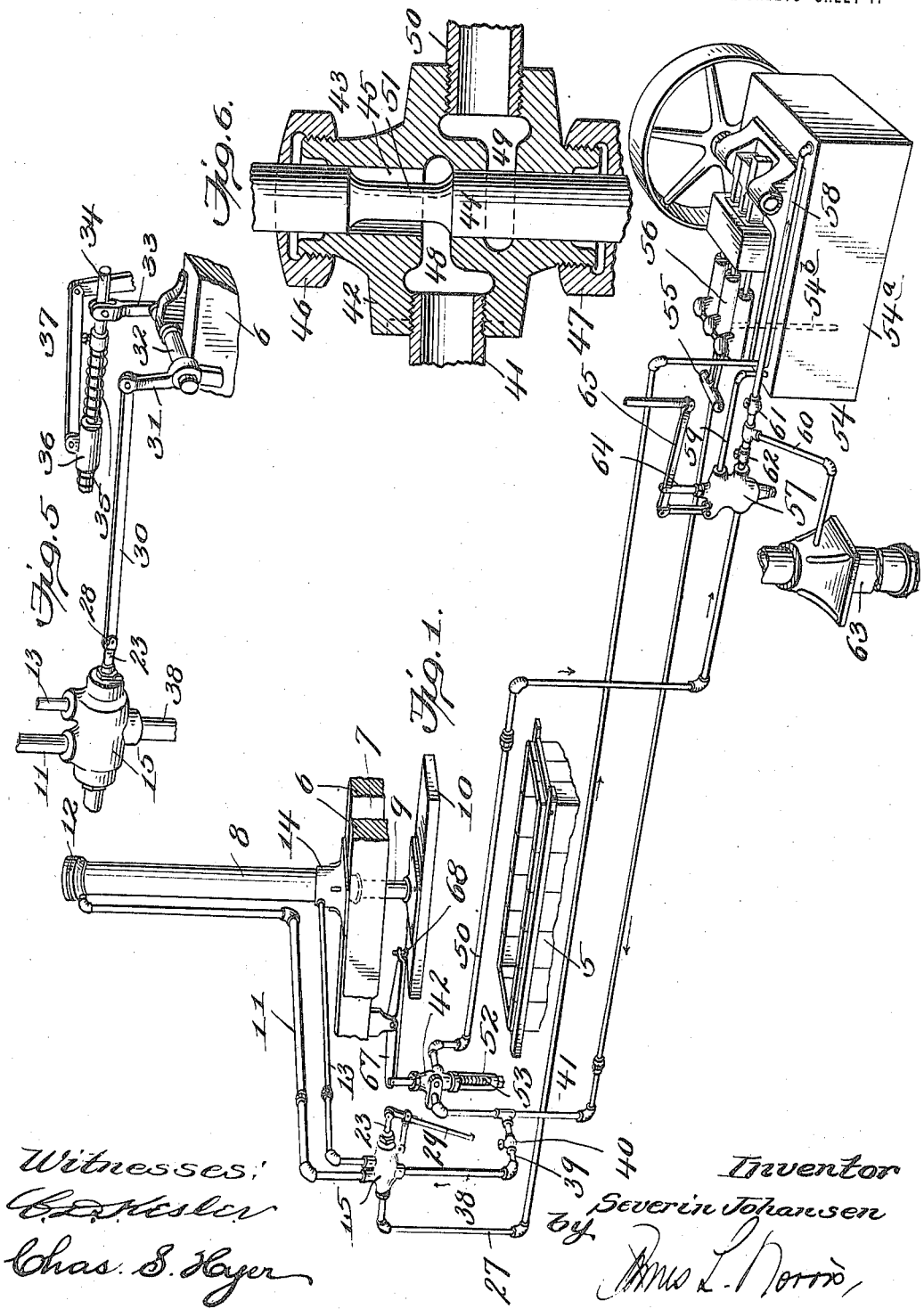

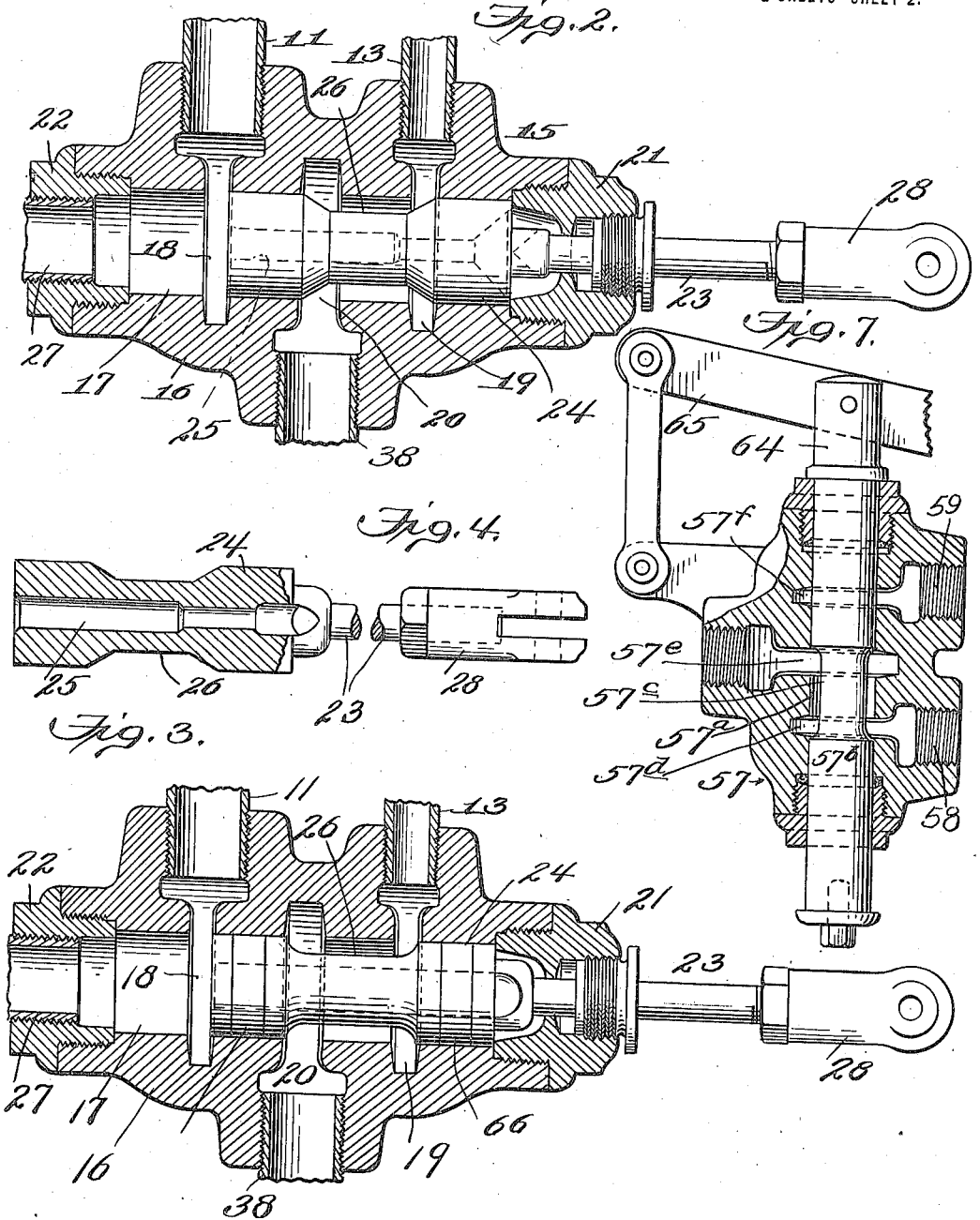

SEVERIN JOHANSEN, OF ATLANTA, GEORGIA.

PRESSURE AND VALVE MECHANISM FOR COTTON-TRAMPERS FOR BALING-PRESSES.

1,234,035. Specification of Letters Patent. Patented July 17, 1917.

Application filed March 29, 1916. Serial No. 87,519.

*To all whom it may concern:*

Be it known that I, SEVERIN JOHANSEN, a citizen of the United States, residing at Atlanta, in the county of Fulton and State of Georgia, have invented new and useful Improvements in Pressure and Valve Mechanism for Cotton-Trampers for Baling-Presses, of which the following is a specification.

This invention relates to baling presses of the power tramper type for baling cotton and analogous products, and more particularly to means for controlling the free circulation of a pressure fluid medium between a pressure generating means and a tramper controlling cylinder and including an automatically operating cylinder supply and exhaust valve that may be either manually operated or automatically actuated and obviate the usual disadvantageous mode of passing a fluid pressure medium through a trap or release valve on a maximum pressure as now practised in certain types of baling presses of the power class. The improved circulation control and valve devices embodying the features of the present invention result in the reduction of power required to drive the pressure generating means to a minimum at such times when a maximum pressure is unnecessary or undesirable relatively to the fluid medium controlling the descent and ascent of the tramper of the baling press. By effecting a free circulation of the fluid medium between the pressure generating mechanism and the tramper operating cylinder with reduced power or pressure force, a material decrease in the strain on the several working parts, both of the pressure generating mechanism and the tramper mechanism, will ensue, and, furthermore, such provision will also result in economizing in the power necessary to effectively operate the tramper controlling means in baling cotton or other material.

A preferred embodiment of the invention is disclosed in the accompanying drawings, only a sufficient portion of the automatic or trip mechanism actuated by the tramper platen or follower block being shown relatively to the main or regulating valve and circulating organization to demonstrate a practical disclosure of the invention. It is proposed to use the improved circulating organization including the valves, which will be hereinafter specified, in connection with any automatically operating mechanism associated with the regulating valve and actuated by the movement of the tramper platen or follower block, and in other instances the regulating valve may be manually operated independently of the automatic mechanism that may have other functions and operated by the tramper platen or follower block in accordance with the type of power tramper baling press with which the improvement may be used and found applicable.

In the drawings:

Figure 1 is a sectional diagrammatic perspective view showing one form of pressure medium generating means, a tramper cylinder and tramper platen or follower block, a portion of a baling press or box, and the circulation organization and valves embodying the features of the invention.

Fig. 2 is a longitudinal vertical section of the pressure medium regulating valve controlling the inlet and gravity exhaust of the pressure medium relatively to opposite portions of the tramper cylinder, this valve being adapted for use with liquid pressure medium.

Fig. 3 is a view similar to Fig. 2 of the same valve adapted for use with steam as a pressure medium.

Fig. 4 is a detail sectional plan view of the piston and piston rod of the valve shown by Fig. 2 and the coupling means therefor.

Fig. 5 is a detail perspective view showing the pressure medium regulating valve and a portion of automatic devices connected thereto for shifting the piston thereof in accordance with the movement of the tramper platen or follower block.

Fig. 6 is a detail transverse section on a slightly enlarged scale of the valve controlling the circulation of the pressure medium between the tramper organization and the pressure generator.

Fig. 7 is a transverse vertical section of a three-way balanced piston valve included in the pressure circulating system and located adjacent to the pressure generator.

The numeral 5 designates a press or baling box which is one of the usual double box constructions and mounted to have a swinging movement so that as one box is filled or has a sufficient quantity of cotton or other material pressed thereinto it will be moved or swung from under the tramper mechanism for further treatment of the bale formed and replaced by another similar empty box. A suitable distance above the box 5, frame timbers or beams 6 are mounted with a space 7 between them as usual, and thereon a tramper cylinder 8 is mounted in upright position and is constructed similarly to devices of this kind. The tramper cylinder will be provided with a suitable piston having a rod or stem 9 connected thereto and working within the cylinder or having a reverse reciprocation in accordance with the pressure medium alternately applied to opposite sides or faces of the cylinder piston. The rod or stem 9 operates through the open space 7 between the timbers or beams 6 and is attached at its lower end to a follower block or platen 10 of such dimensions as to readily move into and upwardly through and above the press or baling box 5.

A pipe 11 is connected to the head 12 of the cylinder 8 and a pipe 13 is connected to the base 14 of the said cylinder, the pipes 11 and 13 alternately serving as feed and exhaust means or outlets for the pressure medium supplied to said pipes in a manner which will be fully hereinafter explained. The pipes 11 and 13 connect with the top of a four-way pressure feed regulating or reversing valve 15, shown in detail in two forms by Figs. 2 and 3 on an enlarged scale. This valve 15 comprises a suitable casing 16 having a bore 17 extending longitudinally thereof from end to end and intersected by two cross-ways 18 and 19 on opposite sides of the center and a central cross-way 20, all of the cross-ways 18, 19 and 20 opening into the longitudinal bore 17. In one end of the casing 16 is a stuffing box 21 and in the opposite end is a packing nut or reducer 22 which may be replaced by any suitable stuffing box device as may be found desirable or necessary. A stem or rod 23 is slidably mounted in the stuffing box 21 and secured at its inner end to a piston 24 which is formed with a bore 25 extending longitudinally therethrough from end to end to render the same tubular, as shown by Fig. 4. The piston 24 is intermediately reduced in diameter, as at 26, to provide an annular way therearound and whereby the ways 18 and 20 or 19 and 20 may have communication through the bore 17. In the nut 22 one end of an exhaust pipe 27 is secured and the relief of the pressure medium therethrough ensues by gravity, as will be hereinafter explained. The outer end of the stem 23 is provided with a coupling head 28 to which a hand-operated lever 29 may be secured, as shown by Fig. 1, or this head 28 may be connected to a link 30, as shown by Fig. 5, and the said link in turn attached to an arm 31 of a crank shaft 32 having a crank 33 pivotally connected to a spring-actuated rod or shaft 34 with springs 35 thereon operating in opposition through the medium of a slide 36 having connecting means 37 to be operated by devices supported on the timbers or beams 6. The automatic mechanism as shown by Fig. 5 is part of that illustrated in my copending application filed March 7, 1916, Serial No. 82,742, said automatic mechanism being controlled as to its functions by the descent and ascent of the follower block or platen 10. It will therefore be understood that it is proposed to operate the valve 15 either manually or by means of automatic mechanism and whereby the piston 24 may be shifted in opposite directions to set up communication between the ways 18 and 20 and the ways 19 and 20. The piston 24 is constructed as a tube or provided with the bore 25 for the purpose of permitting the pressure medium to exhaust therethrough from the way 19 and thence to the exhaust or relief pipe 27, when the said piston 24 is shifted to set up communication between the ways 18 and 20. The way 20 is a part of the inlet means for the pressure medium, and connected to the bottom of the casing 16 and opening into said way 20 is a supply pipe 38 having an angular branch 39 with a check valve 40 therein, the branch 39 intersecting a main circulating pipe 41. This pipe 41, as shown by Fig. 6, connects with the side of a casing 42 of a circulation controlling valve 43, which has diverting or by-pass operations, and provided with a piston 44 extending through opposite ends of the casing 42 or above and below the said valve 43. The valve 43 is vertically disposed and has a central vertical bore 45 and glands 46 and 47 at the upper and lower ends thereof through which the piston 44 has movement. Extending transversely across and opening into the bore 45 are two ways 48 and 49, the pipe 41 opening into the way 48, a return circulation pipe 50 being secured to the opposite side portion of the casing 42 and opening into the way 49. The piston 44, like the piston 24 of the valve 15 hereinbefore explained, is intermediately reduced, as at 51, to form an annular way therearound in order to set up communication between the two ways 48 and 49 or to close off one of said ways relatively to the other. Depending from the casing 42, as shown by Fig. 1, is a cage 52 having a spring 53 therein engaging the depending portion of the piston 44 and operating to automatically force the said piston upwardly when the latter is free or unrestricted for such movement. When the piston is moved downwardly, such operation thereof is against the resistance of the spring 53, and hence this latter spring is compressed and a withdrawal of the downward impelling force from the upper end of the piston will immediately result in a quick action of the said spring and an upward movement of the piston.

A pressure generating pump generally indicated by 54 and comprising a reservoir or tank 54ᵃ for the fluid is shown in Fig. 1, said generating pump being for the purpose of creating a hydraulic pressure and embodying a suction pipe 54ᵇ extending into the tank, as shown by dotted lines. This generating pump is of the usual type well understood in the art and may be modified at will, or any other device of this character may be used. The pipe 41 connects with a manifold 55 in pressure communication with a piston organization, as at 56, and the return circulation pipe or pipe section 50 is connected to a three-way balanced piston valve 57 also having pipe connections 58 and 59 respectively with the rear and front portions of the reservoir or tank 54ᵃ. This valve is shown in detail by Fig. 7 and comprises a vertical bore 57ᵃ, a piston 57ᵇ movable therein and provided with an intermediate reduced portion or annular groove 57ᶜ to set up communication between the ways 57ᵈ, 57ᵉ and 57ᶠ, or to close communication between said ways and control the fluid flow relatively to the pipes 50, 58 and 59. A pipe 60 is connected to the pipe 58 between a globe valve 61 and check valve 62 and leads to a press cylinder 63 which is utilized for pressing a bale to the required density. The piston 57ᵇ of the valve 57 is as usual controlled through the medium of a stem 64 by a shifting lever 65 and whereby the circulation of the pressure medium may be changed or the pipe 59 may be closed and the pipe 60 immediately opened for permitting the pressure to be exerted in the press cylinder 63. This generating mechanism and the particular connection thereof with the press cylinder 63 may be varied at will, as hereinbefore specified, and the same is only incidentally referred to as a demonstration of one pressure generating means, and to bring out the advantages of the circulating system or organization involving the features of the present invention and which will be more fully hereinafter specified. When the piston 57ᵇ is down and pipe 50 is open to pipe 60 through the way 57ᵈ and the remaining ways 57ᵉ and 57ᶠ are relatively closed, the press cylinder 63 is then open to said pipe 50. When the globe valve 61 is closed the press plunger in cylinder 63 is raised to proper height or the full density of the bale and stands in that position until valve piston 57ᵇ is operated by lever 65 and raised by shutting off pipe 60 and opening pipe 59 to the tank through the ways 57ᵉ and 57ᶠ then in communication. The press plunger is still standing up, but under dead pressure against the check and globe valves until the bale is tied out. Instead of the pressure generator as shown by Fig. 1, and whereby hydraulic pressure may be utilized in operating the power tramper baling press or in actuating the platen or follower block 10, the valve 15 may be slightly modified to adapt the same for use with steam, said modification being illustrated by Fig. 3 and consisting simply in supplying the piston 24 with packing bands or rings 66, the valve shown by Fig. 3 being in all other respects similar to that illustrated by Fig. 2 and having like reference characters applied to corresponding parts.

The piston 44 of the valve 43 is moved downwardly against the resistance of the spring 53 by a rocking or trip lever 67 intermediately fulcrumed to the under side of one of the timbers or beams 6 and having one end movably attached to the upper end of said piston. The opposite end of the lever 67 is provided with an adjustable tappet screw 68 which is in the path of movement of the tramper platen or follower block 10 and is engaged by the latter on its ascent just before it rises to its full upward limit. By the engagement of the platen or follower block 10 with the tappet 68 the adjacent end of the lever 67 is forced upwardly and the opposite end downwardly, thereby forcing the piston 44 downwardly against the resistance of the spring 53 and closing and opening communication between the ways 48 and 49 of the valve 43 by means of the annular way 51 of the said piston 44, and under these conditions the pressure medium will then circulate forwardly through pipe 41 to and through the way 48 and through a portion of the bore 45 to the way 49, and thence by the return circulation pipe or section 50 back to the pressure generating pump or means, the piston 24 of the valve 15 having been previously operated either by hand or through the automatic mechanism shown in part by Fig. 5 to set up communication between the way 20 or inlet of the valve 15 and the way 19 to which the pipe 13 is connected and also to the base 14 of the tramper cylinder 8 to permit the pressure medium to enter the cylinder 8 below the piston in the latter and force the said piston and rod or stem 9 upwardly. By adjusting the piston 24 of the valve 15 to establish communication between the inlet way 20 and the way 19, the way 18 is cut off from the way 20 and the upper portion of the cylinder 8 or the pressure medium therein is relieved and the said pressure medium flows downwardly through the pipe 11 into the way 18 and thence through the outlet or exhaust pipe 27 by gravity and back to the pressure generating pump or means. A static column of pressure medium is maintained in the cylinder 8 and through the pipe 13, a portion of the valve 15 and the pipe 38 to the check valve 40, said static column remaining constant as long as the tramper platen or follower block 10 is elevated as shown by Fig. 1, and during such elevation of the tramper platen or follower block 10 the pressure medium circulates forwardly and backwardly through the pipes 41 and 50 by way of the valve 43 and during this interval the press cylinder 63 completing the bale may be operated at a time when the empty bale or press box 5 is being supplied with cotton previous to the descent thereinto of the tramper platen or follower block 10. At a proper interval the piston 24 of the valve 15 is shifted to the left from the position shown by Figs. 2 and 3, either by the automatic mechanism illustrated by Fig. 5 or the hand-lever 29 shown by Fig. 1, and in view of this changed position of the piston 24 the ways 20 and 18 are opened to communication through the medium of the reduced portion 26 of the piston 24 and the pressure medium is then admitted to the upper end or head 12 of the cylinder 8 by the pipe 11 and simultaneously the pressure medium within the cylinder which has been forming a static column will be released through the pipe 13, way 19 and bore 25 of the piston 24 and thence by way of the pipe 27 back to the generator 54. The application of the pressure medium to the head 12 of the cylinder 8 will immediately cause the tramper platen or follower block 10 to descend and disengage the lever 67 and instantly the spring 53 of the valve 43 forces the piston 44 of the latter valve into the position shown by Fig. 6 and thereby cuts off the return pipe 50 which will permit the pressure medium to flow upwardly through the pipe 38 by way of the branch 39 and past the check valve 40, the pressure medium continuing to flow into the cylinder 8 until the tramper platen or follower block 10 has reached its lowest limit or stroke, when a reverse movement thereof will immediately ensue either under manual control or automatically.

The pipe 11 is of slightly greater diameter than the pipe 13 to permit a rapid exhaust or relief of the pressure fluid from the upper part of the cylinder 8 when the follower block or platen 10 rises or ascends to normal position after performing its pressing function, and as there is no resistance on the follower block or platen 10 during its elevation except that in opposition to a body rising against the force of gravity, the pipe 13 of less diameter than the pipe 11 will feed or supply ample fluid pressure to the base 14 of the cylinder to rapidly elevate or cause an ascent of the follower block or platen 10. Through the medium of the valve 43 it will be seen that the flow of the fluid either into the tramper cylinder or short-circuited back to the pressure generating pump or means is positively and automatically controlled and when the pressure medium is short-circuited back to the pressure generating pump or means the power required to operate the pressure generating pump or means is reduced to a minimum. Moreover, the circulating organization or system hereinbefore disclosed permits the pressure medium to be kept in circulation at low pressure by the interposition of the circuit controlling or bypass valve 43 and the valves 43, 15 and 57 disposed as shown and described provide for instantly changing the pressure medium in its direction of flow relatively to the several pipes and make it possible to operate the tramper mechanism separately or in connection with cotton or other baling presses or any other type of analogous pressure regulating machines. The main advantage, however, of the present construction and arrangement of parts is that the maximum power for driving the pressure generating pump is only required to be exerted on a comparatively small portion of the downward movement of the tramper platen or follower block into the press or baling box, thereby materially reducing the strain on the mechanism and especially the pressure generating pump at times when the full or maximum pressure of the latter is unnecessary. When working automatically or when the valve 15 is connected up to automatic mechanism instead of hand-operated means, the tramper or follower block will positively operate without the least manual attention. While it is preferred, as hereinbefore noted, to utilize the circulating pipe organization and valves herein disclosed in connection with the automatic mechanism embodied in my copending application above referred to, it might equally well be used with any other automatic mechanism or is not confined in the performance of its function to any particular automatic mechanism.

What is claimed is:

1. In mechanism of the class specified, the combination of pressure mechanism, a cylinder having a tramper platen and rod coöperating therewith, pipe connections between the pressure mechanism and said cylinder, an automatically operating diverting valve for effecting by-passing of the fluid medium when the tramper platen is elevated, and a valve between the cylinder and said diverting valve for changing the direction of flow of the fluid medium relatively to the cylinder.

2. In mechanism of the class specified, the combination of pressure mechanism, a cylinder having a tramper platen and rod reciprocatingly coöperating therewith, pipe connections between the said mechanism and cylinder, an automatically operating diverting valve interposed in the pipe connections, a valve in the pipe connections between the said diverting valve and the cylinder for changing the direction of the flow of the fluid medium and having a shiftable piston, a supply inlet, two delivery outlets connected to the opposite extremities of the cylinder and an exhaust outlet having a return connection to the pressure mechanism, and means for operating the said diverting valve, whereby the power required to drive the pressure mechanism is reduced to a minimum at such times when a maximum pressure flow of the fluid medium is unnecessary relatively to the cylinder.

3. In a mechanism of the class specified, the combination of pressure mechanism for a fluid medium, a cylinder having a tramper platen and rod reciprocatingly coöperating therewith, pipe connections between the said pressure mechanism and the upper and lower portions of the cylinder, a four-way valve interposed in the pipe connections for alternately changing the direction of flow of the fluid medium relatively to opposite extremities of the cylinder, means for operating the said four-way valve, and a diverting valve also connected to the four-way valve and the pressure mechanism and automatic in its operation.

4. In mechanism of the class specified, the combination of pressure mechanism for operating with a fluid medium, a cylinder having a tramper platen and rod reciprocatingly coöperating with the cylinder, fluid medium circulating pipes between the said pressure mechanism and the opposite extremities of the cylinder, a diverting valve interposed in the pipes and having means for automatic operation by the tramper platen, a flow reversing valve also interposed in the pipes between the said diverting valve and cylinder, and means for operating the said reversing valve.

5. In mechanism of the class specified, the combination of pressure mechanism for giving pressure to a fluid medium, a cylinder having a tramper platen and rod reciprocatingly coöperating therewith, fluid medium circulating pipes between the said pressure mechanism and the upper and lower portions of the cylinder, a diverting valve for the fluid medium interposed in a portion of the pipes and normally held in such position as to permit a continuous flow of the fluid medium toward the cylinder, means connected to the said diverting valve and automatically operable by the platen when the latter rises to its full limit to set up a circulation of the fluid medium between the said valve and mechanism and maintain a static column between the valve and cylinder and within the latter, and a reversing valve operable to change the direction of flow of the fluid medium relatively to the cylinder when the tramper platen descends and when the diverting valve is restored to normal position.

6. In a mechanism of the class specified, the combination of pressure mechanism for giving pressure to a fluid medium, a cylinder having a tramper platen and a rod reciprocatingly coöperating therewith, pipe connections between the said pressure mechanism and the upper and lower portions of the cylinder, a four-way valve interposed in the pipe connections and comprising a casing having an intermediate inlet way and other ways individually disposed on opposite sides of the inlet way and forming two distinct communicating connections respectively with the upper and lower portions of the cylinder, the casing of this valve also having an exhaust outlet at one end, a tubular piston within the casing having an intermediate reduced portion to set up communication between the ways and also providing an exhaust means therethrough relatively to one of the ways, means for shifting the said piston, and a circulation diverting valve interposed in a portion of the said pipes and connected to the intermediate way of the four-way valve.

7. In mechanism of the class specified, the combination of pressure mechanism for giving power to a fluid medium, a cylinder having a tramper platen and rod coöperating therewith, pipe connections between the pressure mechanism and the upper and lower portions of the cylinder, an automatically operating diverting valve disposed in a portion of the pipe connections and controlling the circulation of the power pressure fluid medium when the tramper platen is elevated relatively to the said cylinder, a flow changing valve also interposed in the pipe connections between the said diverting valve and the cylinder, a three-way balanced piston valve provided with means for operating the piston and interposed in the pipe connections near the said pressure mechanism and connected to the press cylinder, and check and manually operative valve means in a part of the pipe connections between the three-way valve and said pressure mechanism.

In testimony whereof I have hereunto set my hand in presence of two subscribing witnesses.

SEVERIN JOHANSEN.

Witnesses:
W. E. HARRISON,
L. R. VAUGHN.